Figure 1:
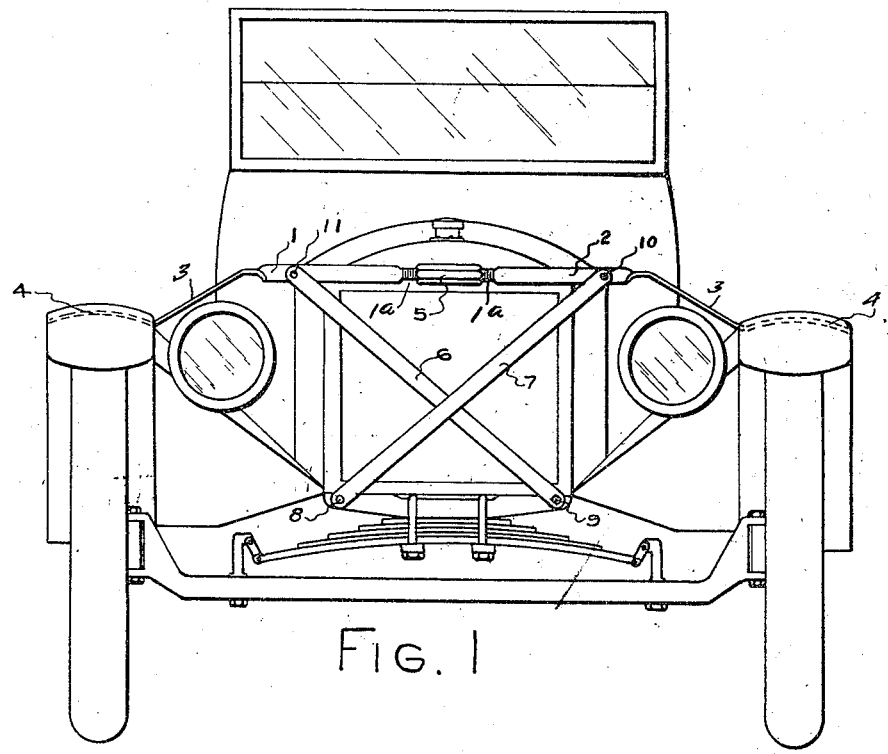

July 10, 1923.

F. L. BRONSON

ADJUSTABLE FENDER BRACE

Filed Oct. 3, 1922

1,461,304

INVENTOR
Fred L. Bronson

Patented July 10, 1923.

1,461,304

UNITED STATES PATENT OFFICE.

FRED L. BRONSON, OF WICHITA FALLS, TEXAS.

ADJUSTABLE FENDER BRACE.

Application filed October 3, 1922. Serial No. 592,181.

*To all whom it may concern:*

Be it known that I, FRED L. BRONSON, a citizen of the United States, residing at Wichita Falls, in the county of Wichita and State of Texas, have invented a new and useful Adjustable Fender Brace, of which the following is a specification.

The invention relates to improvements in fender braces for motor vehicles, and one of its objects is the provision of a device of this character by means of which the front fenders of a vehicle may be so connected to a fixed part of the vehicle as to prevent them from rattling, loosening and sagging, and by means of which sagging fenders may be returned to and maintained in their original positions.

Another object of the invention is to provide a brace of the nature stated to be used as an accessory or attachment and which may be applied to any make of vehicle as a permanent fixture, or be removed therefrom as desired.

Another object of the invention is to provide a brace of the nature stated which shall be very simple and practical, which shall be cheap to manufacture and which may be easily and quickly installed.

The nature and the advantages of the invention will be better understood on reference to the following detailed description when taken in connection with the accompanying drawing. The invention resides in the construction, combination and arrangement of parts as more fully disclosed hereinafter and claimed.

Figure 2:
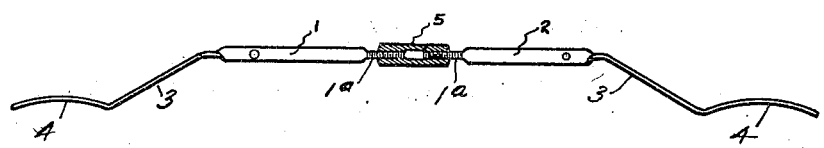

In the drawing forming a part of this application the various parts are referred to by numbers, and wherein:

Figure 1 is a front view of an automobile showing the manner of using the invention, and Figure 2 is a detail view in front elevation of the main bar of the brace.

The brace forming the subject matter of this invention, comprises a main or fender connecting and supporting bar which consists of sections 1 and 2. Each of the main bar sections 1 and 2 is of similar or like formation and comprises an inner straight portion, an intermediate inclined portion 3, and an outer curved portion 4 which conforms to the transverse curvature of the fender to obtain a snug fit thereagainst. The straight portions of the main bar sections 1 and 2 are provided with reversely thread stems 1ª upon which is mounted a threaded sleeve or turnbuckle 5 which connects the sections in a manner to permit them to be adjusted endwise with respect to each other.

In practice, the curved terminals 4 of the main bar are connected to the fenders in the manner shown in Figure 1 of the drawing. This connection is made preferably by means of bolts. The main bar extends across the front of the radiator, and the straight portions thereof are located above the fenders, and it is supported in position by inclined stay arms 6 and 7 which are pivotally connected at their lower ends to a convenient portion of the vehicle adjacent the base of the radiator as at 8 and 9, and which are pivotally connected at their upper ends to the straight portions of the main bar sections 1 and 2 as at 10 and 77.

As the main bar sections 1 and 2 are adjustably connected together, and as the stay bars 6 and 7 are pivoted to the vehicle and to the main bar sections, the terminals 4 will be moved inwardly and upwardly when the sleeve or turnbuckle 5 is operated to draw the main bar sections inwardly, with the result that a tension may be placed upon the fenders which will prevent them from rattling and sagging. Furthermore, the inward relative adjustability of the main bar sections permits the device to be employed for the purpose of returning sagging fenders to their normal positions, and permits any looseness that might occur in the fenders to be taken up.

From the foregoing description, taken in connection with the accompanying drawing, it should be apparent that the brace may be easily and cheaply manufactured and readily placed in position and will support corresponding oppositely disposed fenders in a manner to prevent them from loosening and rattling and sagging. The parts of the brace are formed of metal, preferably of steel.

Having thus described the invention, what I claim is:

A brace for the wheel fenders of a motor vehicle, comprising a sectional main bar arranged in front of and extending transversely of the radiator and having its outer ends attached to the fenders, means by which the sections of the main bar may be adjusted inwardly in an endwise direction with respect to each other, and stay bars pivoted respectively at their upper ends to the respective sections of the main bar and pivoted at their lower ends to a convenient portion of the vehicle adjacent the lower end of the radiator and adapted to raise the main bar when its sections are adjusted inwardly with respect to each other.

FRED L. BRONSON.